(12) United States Patent
Berger et al.

(10) Patent No.: US 8,327,259 B2
(45) Date of Patent: Dec. 4, 2012

(54) STORING TABLE DATA

(75) Inventors: Peter Glen Berger, Irwin, PA (US);
Jesse Chapman, Richmond (CA);
Matthew Ross Lehrian, Pittsburgh, PA (US); Peter Su, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 1256 days.

(21) Appl. No.: 11/890,789

(22) Filed: Aug. 6, 2007

(65) Prior Publication Data

US 2009/0043804 A1 Feb. 12, 2009

(51) Int. Cl.
*G06F 17/00* (2006.01)
(52) U.S. Cl. ......... 715/227; 715/228; 715/243; 715/255
(58) Field of Classification Search .................. 715/212, 715/213, 216, 220
See application file for complete search history.

(56) References Cited

U.S. PATENT DOCUMENTS

| | | | |
|---|---|---|---|
| 6,613,098 B1* | 9/2003 | Sorge et al. | 715/234 |
| 6,988,241 B1* | 1/2006 | Guttman et al. | 715/220 |
| 7,454,695 B1* | 11/2008 | Grigoriev | 715/227 |
| 8,020,089 B1* | 9/2011 | Brichford et al. | 715/234 |
| 2005/0183008 A1* | 8/2005 | Crider et al. | 715/517 |
| 2006/0117253 A1* | 6/2006 | Polash | 715/517 |
| 2008/0028288 A1* | 1/2008 | Vayssiere et al. | 715/219 |
| 2008/0180413 A1* | 7/2008 | Farn | 345/184 |

OTHER PUBLICATIONS

Chang et al., "Bigtable: A Distributed Storage System for Structured Data", 2006, Google, Inc, pp. 1-14.*

* cited by examiner

*Primary Examiner* — Chau Nguyen
(74) *Attorney, Agent, or Firm* — Kilpatrick Townsend & Stockton LLP

(57) ABSTRACT

In some embodiments, the grid definition and data source definition portions of a table definition are segregated. Grid definition values included in the grid definition portion include one or more grid geometry values and/or grid line style values. Cell content values included in the data source definition portion include one or more data values and/or cell-specific style values.

31 Claims, 4 Drawing Sheets

| | | |
|---|---|---|
| | | |
| | | |
| | | |
| | | |

| ❁Destinations❁ | Airfare | |
|---|---|---|
| *Tahiti* | $900 | Discounted! |
| *Bora Bora* | $1350 |  |
| Bali | $1500 | |

```
<table>
  <grid>
    <columns>
    </columns>
    <vertical-gridline-styles>
    </vertical-gridline-styles>
    <rows>
    </rows>
    <horizontal-gridline-styles>
    </horizontal-gridline-styles>
    <datasource>
       <cell>
       </cell>

⋮

<cell>
       </cell>
    </datasource>
  </grid>
</table>
```

FIG. 1B

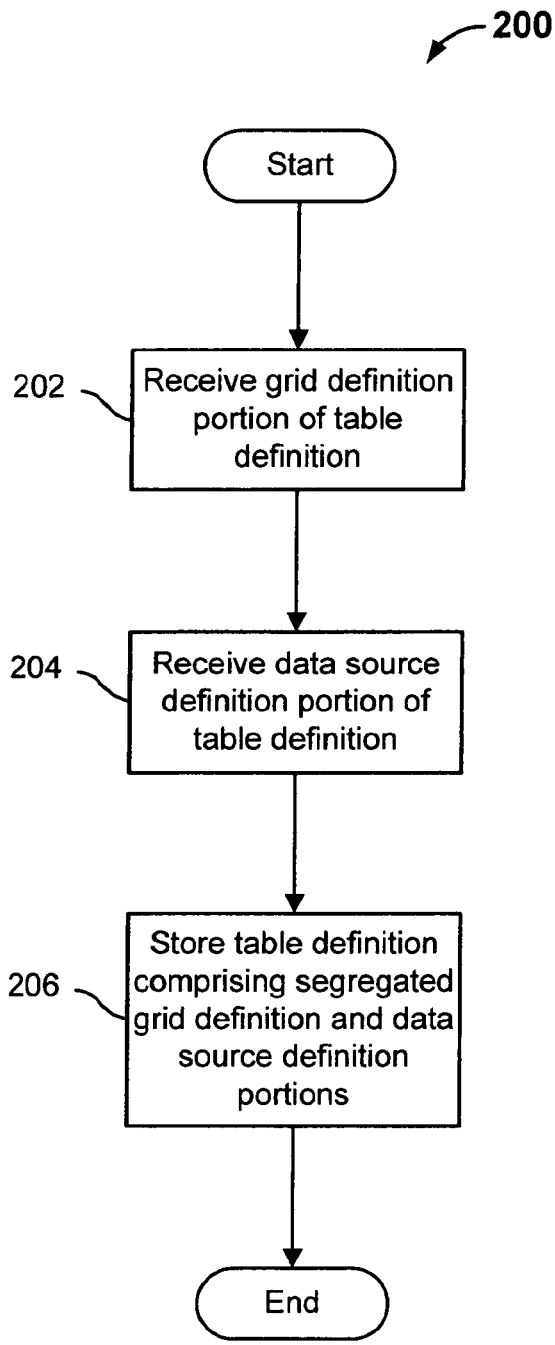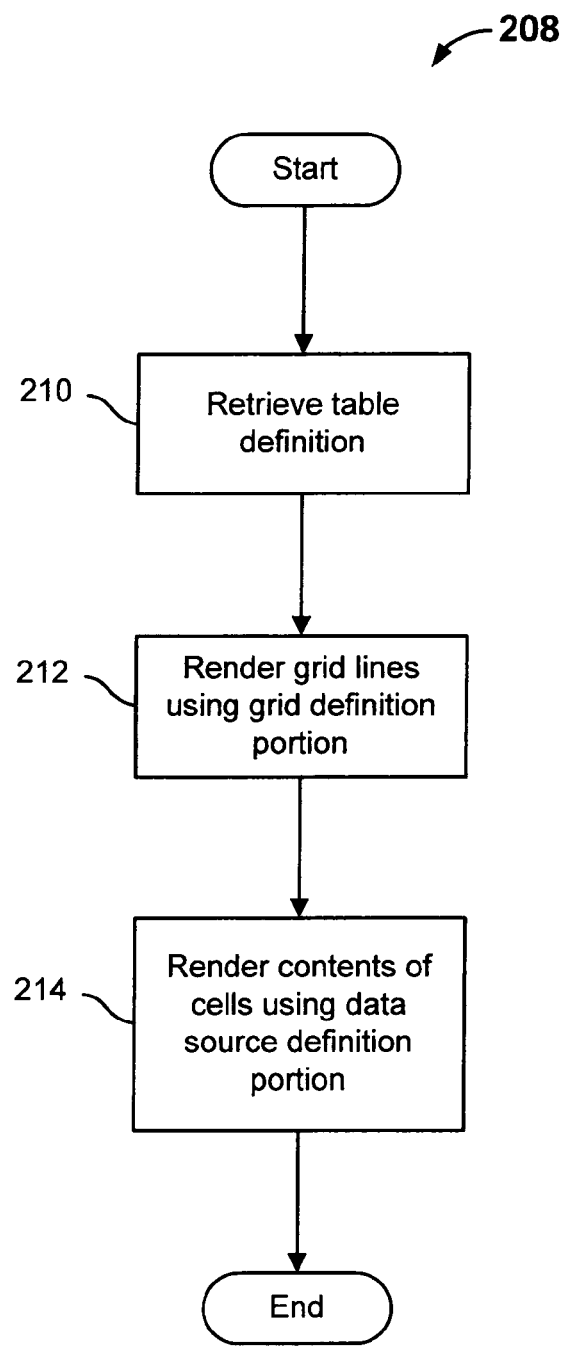
FIG. 2A
FIG. 2B

| ❀Destinations❀ | Airfare | |
|---|---|---|
| Tahiti | $900 | Discounted! |
| Bora Bora | $1350 | ▨ |
| Bali | $1500 | ▨ |

FIG. 3A

| | | |
|---|---|---|
| | | |
| | | |
| | | |
| | | |

FIG. 3B

| ❀Destinations❀ | Airfare | |
|---|---|---|
| Tahiti | $900 | Discounted! |
| Bora Bora | $1350 | ▨ |
| Bali | $1500 | |

FIG. 3C

STORING TABLE DATA

BACKGROUND OF THE INVENTION

Typically, a table definition comprises of a series of definitions of cells of the table. A cell definition typically includes, for example, values associated with cell content and layout (i.e. boundaries). Values associated with cell layout included with respect to each cell definition collectively provide the definition of the grid lines associated with the table. Thus, the grid line geometry and grid line styles of a table are typically defined with respect to cells of the table. If changes are desired to be made to the grid lines of a table in an existing table definition, changes must be made with respect to corresponding grid line definitions included with respect to each affected cell in the table definition.

BRIEF DESCRIPTION OF THE DRAWINGS

Various embodiments of the invention are disclosed in the following detailed description and the accompanying drawings.

FIG. 1B illustrates an embodiment of an outline of a syntax of a table definition.

FIG. 2A illustrates an embodiment of a process for storing a table definition.

FIG. 2B illustrates an embodiment of a process for rendering a table.

FIG. 3A illustrates an embodiment of a table 300.

FIG. 3B illustrates a portion of a table defined in a grid definition portion.

FIG. 3C illustrates a portion of a table defined in a data source definition portion.

DETAILED DESCRIPTION

Figure 1A:
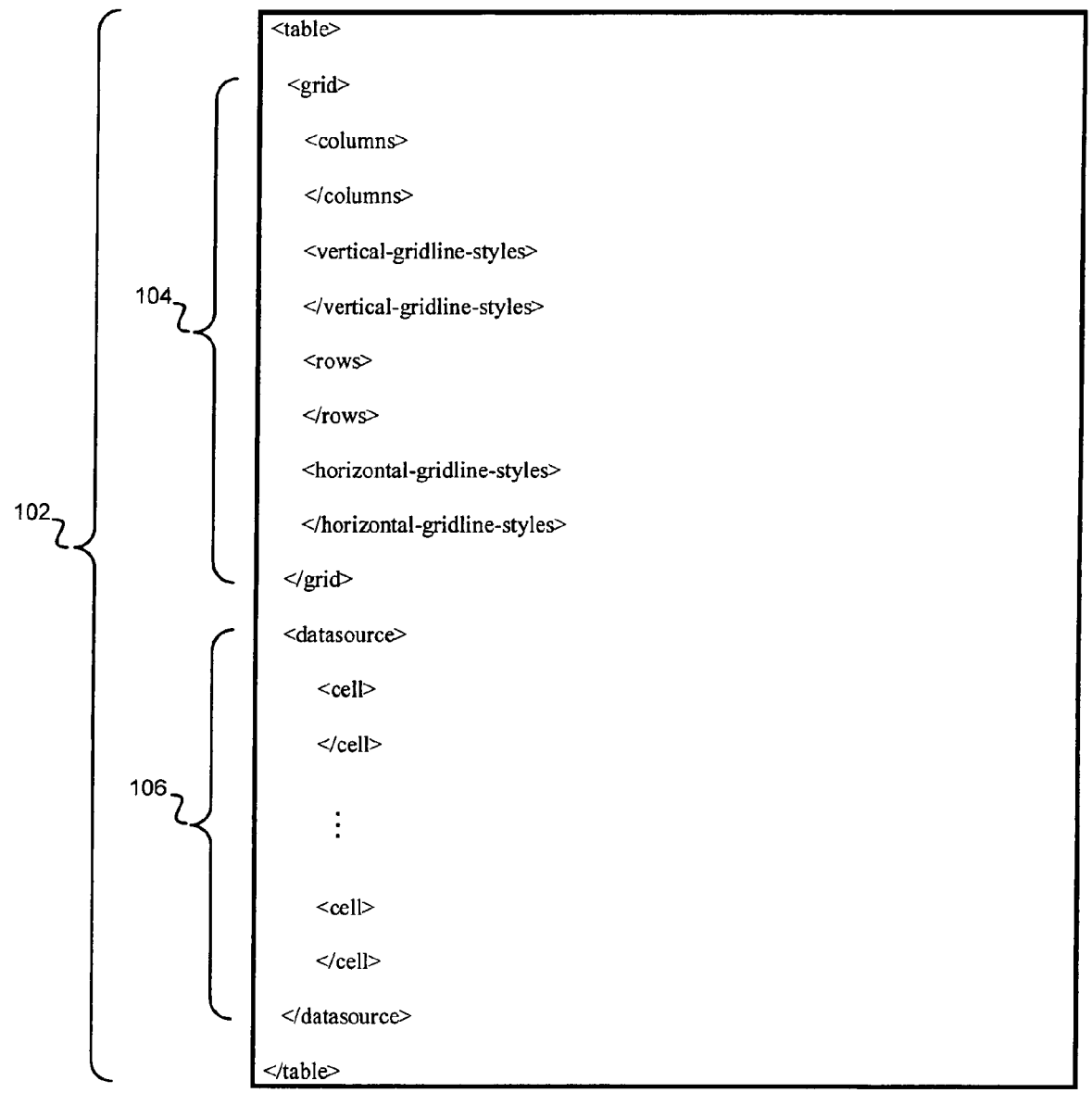
FIG. 1A illustrates an embodiment of an outline of a syntax of a table definition.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A table is comprised of one or more rows and columns of cells. In some embodiments, the cells of a table are associated with at least standard spreadsheet functionality. The term "at least standard spreadsheet functionality" in the context of cells of a table includes the ability to define the content of one cell in such a way that the content of the one cell is determined based at least in part on the content of one or more other cells, and the content of the one cell is updated automatically without further human action if the content of one or more of the one or more other cells is changed.

In some embodiments, as disclosed herein, grid definition and data source definition portions of a table definition are segregated. Grid definition values included in the grid definition portion of the table definition include one or more grid geometry values and/or grid line style values. Examples of grid geometry values include number of rows, number of columns, number of hidden rows, number of hidden columns, column widths, row heights, etc. Examples of grid line style values include grid line type (e.g., solid, dotted, dashed, etc.), grid line thickness, grid line color, etc. Cell content values included in the data source definition portion of the table definition include one or more data values and/or cell-specific style values. Examples of data values include text, numbers, formulas, images, etc. Examples of cell-specific style values include a background fill color, a font style and/or size, a data value alignment, etc. In various embodiments, a cell data value may comprise a concrete data value that is specified in the table definition and rendered with respect to the cell and/or a pointer to an abstract or external data value, e.g., stored in an external data source from which it is retrieved when the table is rendered.

In some embodiments, a table is defined using XML (Extensible Markup Language). In some embodiments, a set of one or more style sheets includes one or more supported style definitions for various components of a table, such as one or more grid line styles and cell styles. In some such cases, a table definition includes references to such pre-defined style definitions with respect to one or more components. Using a style sheet to abstract out the detailed definition of styles simplifies the table definition and facilitates changing style definitions across many tables by changing the style sheet.

FIG. 1A illustrates an embodiment of an outline of a syntax of an XML table definition. As depicted in the given example, the table definition is packaged into a single table element 102. Table element 102 may include one or more attributes associated with it which control, e.g., the manner in which it will be displayed. Examples of such attributes include a table name; an internal table identifier used for formulas, e.g., if the table is associated with spreadsheet functionality; a number of header rows, header columns, and footers; whether a table name is visible with respect to a display of the table; whether grouping is enabled on the table, etc. Table element 102 includes, as sub-elements, a grid definition element 104 and a data source element 106.

In various embodiments, the grid definition element 104 may include one or more grid geometry values and/or grid line style values. In the given example, grid geometry values are included in the column and row elements, and grid line style values are included in the vertical-gridline-styles and horizontal-gridline-styles elements. Examples of values included in the column element include number of columns, number of hidden columns, column widths, etc., and examples of values included in the row element include number of rows, number of hidden rows, row heights, etc. The vertical-gridline-styles and horizontal-gridline-styles elements may include style definitions for one or more vertical and horizontal grid lines or portions thereof, respectively.

In some embodiments, grid line styles of a table are defined by a set of style runs. A style run may comprise, in some embodiments, vector style elements which have, as attributes, the start and stop indices of the area the style run covers as well as a reference to a pre-defined style that the associated grid line has, which pre-defined style may be defined in a separate style sheet. Alternatively, in some embodiments, a style run may include at least a portion of the style definition inline, rather than as a reference to a pre-defined style defined in a separate style sheet. In some embodiments, a table definition includes a style run for each of at least a subset of vertical and horizontal grid lines of the table or portions thereof As an example, the style run for the fourth vertical grid line of a table comprising 20 rows (e.g., the grid line between columns D and E of a spreadsheet table) may specify that the grid line is red and thick from rows 1-9 and purple and thin from rows 10-20.

The data source element 106 includes definitions of the content that appears in cells of the table. In some embodiments, the data source element 106 includes for each cell of the table that includes content a cell element which includes in its attributes its position in the grid, e.g., in row and column form. A cell element may include one or more data values and/or cell-specific style values. In various embodiments, a data value associated with a cell element may comprise a concrete data value and/or a pointer to an external data value. In some embodiments, cell-specific style values include (e.g., non-grid line) formatting and/or style information, which in some cases is specified using references to pre-defined styles in associated style sheets.

In the example of FIG. 1A, the grid definition element 104 and data source element 106 are both direct sub-elements of table element 102. In some embodiments, the data source element is a sub-element of the grid definition element as depicted by the embodiment of the outline of the syntax provided in FIG. 1B. In both of the examples of FIGS. 1A and 1B, grid definition values and cell content values are segregated.

FIG. 2A illustrates an embodiment of a process for storing a table definition. Process 200 starts at 202 at which a grid definition portion of the table definition is received. In various embodiments, the grid definition portion includes one or more grid geometry values and/or grid line style values. At 204, a data source definition portion of the table definition is received. The data source definition portion includes one or more cell content values of the table. The table definition comprising segregated grid definition and data source definition portions is stored at 206. FIG. 2B illustrates an embodiment of a process for rendering a table. In some embodiments, process 208 is employed to render a table defined and stored using process 200. At 210, a table definition is retrieved. At 212, the grid definition portion of the table definition is employed to render the grid lines of the table. At 214, the data source definition portion of the table definition is employed to render the contents of the cells of the table.

FIG. 3A illustrates an embodiment of a table 300. FIG. 3B illustrates the portion of table 300 defined in a grid definition portion, and FIG. 3C illustrates the portion of table 300 defined in a data source definition portion.

As described herein, the grid definition of a table may be abstracted from the data source definition of the table. Such a table definition scheme results in a table definition to be more modular and permits the grid definition of a table to be more easily modified. In addition, storing the data source information for all cells together in a data source definition portion of the table definition, segregated from the grid geometry and grid line style definition, facilitates changing data values, e.g., in response to user interactions or changes in data values as retrieved from an external source, and/or changing the source from which data values are retrieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for storing table data, comprising:
receiving, with respect to a grid definition portion of a table definition, a specification of a set of one or more grid definition values for a table, wherein the set of grid definition values includes one or more grid geometry values that specify geometry of the table;
receiving, with respect to a data source definition portion of the table definition, a specification of a set of one or more cell content values for cells comprising the table;
storing the table definition, wherein the table definition is segregated such that the grid definition portion of the table definition which defines the geometry of the table is decoupled and separately defined from the data source definition portion of the table definition which defines content of the table; and
rendering the table using a processor according to the stored table definition, wherein rendering the table comprises separately rendering grid lines of the table as specified by the grid definition portion of the table definition and the content of the table as specified by the data source definition portion of the table definition with respect to a prescribed display space at which the table is rendered.

2. A method as recited in claim 1, wherein the set of grid definition values includes one or more grid line style values.

3. A method as recited in claim 1, wherein the one or more grid geometry values comprise one or more of the following: a number of rows, a number of columns, a number of hidden rows, a number of hidden columns, column widths for one or more columns, and row heights for one or more rows.

4. A method as recited in claim 2, wherein the one or more grid line style values comprise one or more of the following: grid line types for one or more grid lines or portions thereof, grid line thicknesses for one or more grid lines or portions thereof, and grid line colors for one or more grid lines or portions thereof.

5. A method as recited in claim 2, wherein the one or more grid line style values are included in a set of one or more style runs.

6. A method as recited in claim 1, wherein the grid definition portion includes a style run for each of at least a subset of vertical and horizontal grid lines or portions thereof of the table.

7. A method as recited in claim 1, wherein the set of cell content values includes one or more data values, one or more cell-specific style values, or both.

8. A method as recited in claim 1, wherein a cell content value comprises a specific data value specified in the table definition.

9. A method as recited in claim 1, wherein a cell content value comprises a pointer to an external data value.

10. A method as recited in claim 1, wherein a set of one or more style sheets includes one or more style definitions.

11. A method as recited in claim 10, wherein the table definition includes one or more references to one or more style definitions in the set of one or more style sheets with respect to one or more components.

12. A method as recited in claim 1, wherein the table definition comprises a single XML element.

13. A method as recited in claim 1, wherein the grid definition portion comprises a first element and the data source definition portion comprises a second element.

14. A method as recited in claim 13, wherein the second element is a sub-element of the first element.

15. A method as recited in claim 1, wherein the table is associated with spreadsheet functionality.

16. A system for storing table data, comprising:
a processor configured to:
receive, with respect to a grid definition portion of a table definition, a specification of a set of one or more grid definition values for a table, wherein the set of grid definition values includes one or more grid geometry values that specify geometry of the table;
receive, with respect to a data source definition portion of the table definition, a specification of a set of one or more cell content values for
cells comprising the table;
store the table definition, wherein the table definition is segregated such that the grid definition portion of the table definition which defines the geometry of the table is decoupled and separately defined from the data source definition portion of the table definition which defines content of the table;
render the table according to the stored table definition, wherein to render the table comprises separately rendering grid lines of the table as specified by the grid definition portion of the table definition and the content of the table as specified by the data source definition portion of the table definition with respect to a prescribed display space at which the table is rendered; and
a memory coupled to the processor and configured to provide instructions to the processor.

17. A system as recited in claim 16, wherein the set of grid definition values includes one or more grid line style values.

18. A system as recited in claim 17, wherein the one or more grid line style values comprise one or more of the following: grid line types for one or more grid lines or portions thereof, grid line thicknesses for one or more grid lines or portions thereof, and grid line colors for one or more grid lines or portions thereof.

19. A system as recited in claim 16, wherein the set of cell content values includes one or more data values, one or more cell-specific style values, or both.

20. A system as recited in claim 16, wherein the one or more grid geometry values comprise one or more of the following: a number of rows, a number of columns, a number of hidden rows, a number of hidden columns, column widths for one or more columns, and row heights for one or more rows.

21. A system as recited in claim 16, wherein a cell content value comprises a pointer to an external data value.

22. A system as recited in claim 16, wherein the table definition comprises a single XML element.

23. A system as recited in claim 16, wherein the table is associated with spreadsheet functionality.

24. A computer program product for storing table data, the computer program product being embodied in a non-transitory computer readable storage medium and comprising computer instructions for:
receiving, with respect to a grid definition portion of a table definition, a specification of a set of one or more grid definition values for a table, wherein the set of grid definition values includes one or more grid geometry values that specify geometry of the table;
receiving, with respect to a data source definition portion of the table definition, a specification of a set of one or more cell content values for cells comprising the table;
storing the table definition, wherein the table definition is segregated such that the grid definition portion of the table definition which defines the geometry of the table is decoupled and separately defined from the data source definition portion of the table definition which defines content of the table; and
rendering the table according to the stored table definition, wherein rendering the table comprises separately rendering grid lines of the table as specified by the grid definition portion of the table definition and the content of the table as specified by the data source definition portion of the table definition with respect to a prescribed display space at which the table is rendered.

25. A computer program product as recited in claim 24, wherein the set of grid definition values includes one or more grid line style values.

26. A computer program product as recited in claim 25, wherein the one or more grid line style values comprise one or more of the following: grid line types for one or more grid lines or portions thereof, grid line thicknesses for one or more grid lines or portions thereof, and grid line colors for one or more grid lines or portions thereof.

27. A computer program product as recited in claim 24, wherein the set of cell content values includes one or more data values, one or more cell-specific style values, or both.

28. A computer program product as recited in claim 24, wherein the one or more grid geometry values comprise one or more of the following: a number of rows, a number of columns, a number of hidden rows, a number of hidden columns, column widths for one or more columns, and row heights for one or more rows.

29. A computer program product as recited in claim 24, wherein a cell content value comprises a pointer to an external data value.

30. A computer program product as recited in claim 24, wherein the table definition comprises a single XML element.

31. A computer program product as recited in claim 24, wherein the table is associated with spreadsheet functionality.

* * * * *